United States Patent [19]

Doster et al.

[11] 4,217,958
[45] Aug. 19, 1980

[54] SACRIFICIAL AGENTS FOR PETROLEUM RECOVERY PROCESSES

[75] Inventors: Martha S. Doster; Mohan V. Kudchadker, both of Houston, Tex.

[73] Assignee: Texaco Inc., White Plains, N.Y.

[21] Appl. No.: 963,642

[22] Filed: Nov. 24, 1978

[51] Int. Cl.² ............................................. E21B 43/22
[52] U.S. Cl. ..................................... 166/274; 166/275; 252/8.55 D
[58] Field of Search .................. 252/8.55 D; 166/275, 166/274, 273

[56] References Cited
U.S. PATENT DOCUMENTS

| | | | |
|---|---|---|---|
| 2,839,466 | 6/1958 | Shock et al. | 166/275 |
| 2,852,077 | 9/1958 | Cocks | 252/8.55 X |
| 3,258,071 | 6/1966 | Shen et al. | 252/8.55 X |
| 3,469,630 | 9/1969 | Hurd et al. | 166/250 |
| 4,077,471 | 3/1978 | Shupe et al. | 252/8.55 X |
| 4,133,385 | 1/1979 | Kalfoglov | 252/8.55 X |

Primary Examiner—Herbert B. Guynn
Attorney, Agent, or Firm—Carl G. Ries; Robert A. Kulason; Gregory A. Cone

[57] ABSTRACT

In a surfactant flooding process for recovering oil from a subterranean petroleum reservoir, surfactant loss by adsorption onto the mineral grains of the reservoir matrices is reduced by the addition to the surfactant solution of a sacrificial agent selected from the group consisting of polybasic carboxylic acids, their water soluble salts and mixtures thereof.

9 Claims, No Drawings

SACRIFICIAL AGENTS FOR PETROLEUM RECOVERY PROCESSES

BACKGROUND OF THE INVENTION

1. Field of the Invention

This invention relates to the recovery of oil from subterranean reservoirs by chemical flooding methods.

2. Description of the Prior Art

Crude oil which has accumulated in subterranean reservoirs is recovered or produced through one or more wells drilled into the reservoir. Initial production of the crude oil is accomplished by "primary recovery" techniques wherein only the natural forces present in the reservoir are utilized to produce the oil. However, upon depletion of these natural forces and the termination of primary recovery a large portion of crude oil remains trapped within the reservoir. Also, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of crude oil therefrom. Some of the more common methods are water-flooding, steam-flooding, miscible-flooding, $CO_2$-flooding, polymer-flooding, surfactant-flooding, caustic-flooding, and in situ combustion.

Water-flooding which involves injection of water into the subterranean oil reservoir for the purpose of displacing the crude oil from the pore spaces of the reservoir rock towards the producing wells is the most economical and widely used of enhanced oil recovery methods. Nevertheless, water does not displace oil with high efficiency because of the immiscibility of water and oil, and because of the high interfacial tension between them.

Surfactant-flooding involves the addition of one or more surface active agents or surfactants to the water-flood for the purpose of minimizing the water-flooding problems mentioned above. This has been an area of active interest in the art of enhanced oil recovery methods for many years. For example, in 1941, U.S. Pat. No. 2,233,381 disclosed the use of polyglycol ether as a surfactant that increases the capillary displacement efficiency of an aqueous flood. U.S. Pat. No. 3,302,713 discloses the use of petroleum sulfonates as effective surfactants in oil recovery operations. Other surfactants proposed for use in oil recovery processes include alkyl pyridinium salts, alkylsulfates, alkylarylsulfates, ethoxylated alkyl or alkylarylsulfates, alkylarylsulfonates, alkylsulfonates, alkylpolyethoxyalkylene sulfonates, alkylarylpolyethoxyalkylenesulfonates, and quaternary ammonium salts.

Any of the above surfactants may be effective under ideal conditions, however, there are problems concerned with the use of each in most petroleum reservoirs. One of the most serious problems arises from the adsorption of the surfactant chemicals onto the mineral grains of the reservoir rock resulting in an ever declining concentration of the materials as they progress through the reservoir. Compensation for this phenomenon has often required such large amounts of surfactant materials to be injected as to render the use of such materials uneconomical.

Another serious problem inherent in any flooding technique concerns the sweep efficiency of the flooding operation. The sweep efficiency for a flooding operation is directly related to the ratio of the relative mobilities of the displacing and displaced fluids. In almost all cases the unmodified surfactant fluid has a higher relative mobility than that of the residual oil in the reservoir. This results in poor sweep efficiency and is indicated by premature breakthrough of the injected surfactant fluid into the production wells. This premature breakthrough is caused by a selective fingering of the injected fluid through the reservoir leaving a substantial portion of the reservoir volume unswept by the injected surfactant fluid.

One solution to this problem of poor sweep efficiency is to increase the viscosity of the displacing fluid. The common method of achieving this has been to add organic polymers to the injected water which has the effect of increasing water viscosity thereby increasing the sweep efficiency of the recovery technique. U.S. Pat. No. 3,390,529 and U.S. Pat. No. 3,282,337, teach the use of aqueous polyacrylamide solutions to increase the viscosity of the injected water. Polysaccharides as taught in U.S. Pat. No. 3,581,824 have been used for the same purpose. Unfortunately, these polymers are expensive and are adsorbed on the mineral grains of the reservoir rock in much the same way as the surfactants are adsorbed as discussed hereinabove.

The above described problems have been recognized by those skilled in the art of oil recovery and certain so-called "sacrificial" compounds have been proposed to pretreat the formation in order to decrease the adsorption of subsequently injected surfactants and/or polymers. For example, U.S. Pat. No. 3,424,054 discloses the use of aqueous solutions of piperidine. U.S. Pat. No. 3,469,630 discloses the use of sodium carbonate and inorganic polyphosphates. U.S. Pat. No. 3,384,171 discloses the use of unmodified lignosulfonates. However, none of these materials have been entirely satisfactory from a standpoint of performance and economics.

SUMMARY OF THE INVENTION

The process of this invention comprises injecting into the formation via the injection well an aqueous solution of a substance selected from the group consisting of polybasic carboxylic acids or their water soluble salts in admixture with a chemical oil recovery agent, such as surfactant, polymer and/or a micellar dispersion. It is preferable to inject a driving fluid such as water or thickened water to sweep the chemical components through the reservoir to the production well thereby displacing oil from the formation to the surface of the earth.

DESCRIPTION OF THE PREFERRED EMBODIMENTS

A sacrifical material is injected by the process of this invention through an injection means comprised of one or more injection wells into a subterranean petroleum-containing reservoir to preferably occupy or cover all potential adsorption sites within the reservoir thereby reducing the extent of adsorption of the more expensive chemical oil recovery agent. A sacrificial agent performs best when it exhibits adsorption on active sites of rock surfaces and thus diminishes surfactant and/or polymer adsorption.

A satisfactory sacrificial material has several important characteristics, first, it should be less expensive than the surfactant on a cost effectiveness basis since it is to be sacrificed or adsorbed by the formation, probably not to be recovered. Secondly, it must be adsorbed readily by the formation matrix. Another important characteristic of a sacrificial agent is that the presence of such adsorbed sacrificial material should retard or eliminate adsorption of the surfactant and/or polymer chemical material on the adsorption sites of the formation rock. By adsorption sites of the formation rock it is meant those surfaces of the formation rock capable of adsorbing a chemical compound from a solution on contact.

The sacrificial material may not have a detrimental effect upon the recovery efficiency of the chemical flooding operation. Oil recovery is usually increased only if the sacrificial material is followed by or admixed with a surfactant and/or a polymer recovery agent. When a surfactant is chosen as a chemical recovery agent it should be injected with a sacrificial agent for best results and ahead of the following flooding water thereby achieving the desired interfacial tension reduction between the injected fluid and the displaced oil with minimal loss of surfactant on the formation matrix. The surfactant may be present in a hydrocarbon solvent or in an aqueous solution or in a combination thereof. Any anionic, nonionic or cationic type of surfactant known in the art may be used in the practice of this invention. Some types of surfactants which were mentioned previously in addition to surfactants disclosed and claimed in the following U.S. Patents are particularly useful since they have been found to be capable of performing in reservoirs having both high salinities and high hardness levels. See, for example, U.S. Pat. Nos. 3,858,656, 3,811,505, 3,811,504 and 3,811,507.

Likewise, the amount of surfactant which must be employed in the practice of any chemical flood is generally known in the art and is to be found in published literature. However, the slug size of surfactant generally will range from about 0.01 to 1 pore volume of a aqueous surfactant solution having dissolved therein about 0.01 to about 10.0 percent by weight of the surfactant.

In this invention, the sacrificial agent is preferably injected in admixture with the surfactant slug into the petroleum formation. This surfactant/sacrificial agent mixture may be preceded by a slug of sacrificial material in the aqueous solution. It has been found that this technique is superior to the preflush method of injecting a slug or sacrificial material followed by a slug or surfactant solution without sacrificial material included. However, the preflush method is superior to using no sacrificial material at all.

The sacrificial materials useful in the process of this invention are the polybasic carboxylic acids and their water soluble salts. Especially preferred are oxalic acid, malonic acid, succinic acid, maleic acid, malic acid, tartaric acid, citric acid and their water soluble salts. The carboxyl group is postulated to be the important functional group for the modification of the adsorption sites on the mineral grains of the rock matrix. Oxamic acid and its water soluble salts are also preferred sacrificial materials for the practice of this invention. These sacrificial agents are especially useful because they are stable in high sodium, calcium, and magnesium ion environments. Optionally, they may be combined with other agents such as chemically modified lignosulfonates.

The amount of sacrificial agent injected into the reservoir may be an amount up to and including that required to occupy all of the active sites of the formation matrix. If less than the maximum amount is used there will be a corresponding increase in the adsorption of surfactant from the injected surfactant solution onto the formation matrix, although the amount of increase will not be as great as in the case where the formation is completely free of the sacrificial agent. The upper concentration limit is the amount of sacrificial agent needed to occupy the active sites on a formation matrix. The detriment resulting from using excess sacrificial agent would be an increase in cost for operating the oil recovery program. The amount of polybasic carboxylic acids or their water soluble salts needed in the process of this invention depends on the particular formation, the area or pattern to be swept, and other formation characteristics. Those skilled in the art can determine the exact quantity needed to afford the desired amount of protection. Generally, it has been found that the sacrificial agent in the surfactant slug will be effective in concentrations of from about 0.01 to about 10.0 percent by weight of the total surfactant solution while an effective volume of the above materials will range from about 0.01 to 1.0 pore volumes of the aqueous solution containing the sacrificial agent or the surfactant-sacrificial agent solution.

The effectiveness of this invention for reducing the adsorption of surfactant on formation rock in chemical flooding operations is demonstrated by the following examples which are presented for the purpose of illustration and are not intended to limit the scope of the invention as defined in the claims.

EXAMPLE I

This experiment investigated the effectiveness of maleic acid and succinic acid as sacrificial agents for a petroleum sulfonate-solubilizer system comprising Petronate CR ®, a petroleum sulfonate marketed by Witco Chemical Company having a molecular weight of about 495 and also known as TRS 18 ®; Pyronate 40 ®, another Witco petroleum sulfonate having a molecular weight of about 332 and also known as TRS 40 ®; and a nonyl phenol ethoxy ethyl sulfonate solubilizer, ethoxylated with 6.0 moles of ethylene oxide. The active weight percent concentrations of the components were: 0.54 Petronate CR, 1.25 Pyronate 40, and 0.81 ethoxylated nonyl phenol solubilizer. Tests were conducted for the 2.6% solution of petroleum sulfonate-solubilizer on $CaCO_3$. Tests were run at 43° and 74° C. in two different synthetic brines with the concentration of the sacrificial agent being 2.5% by weight. Both succinic acid and maleic acid reduced surfactant adsorption by about ⅓ on the $CaCO_3$ in both brines at both temperatures. These results are reported at Table I.

TABLE I

| SURFACTANT ADSORPTION (mg Surfactant/m² Substrate) | | | | |
|---|---|---|---|---|
| | Brine S[1] | | Brine M[2] | |
| | 43° | 74° | 43° | 74° |
| Surfactant - $CaCO_3$ | 2.0 | 2.1 | 2.4 | 1.9 |
| Maleic acid - Surfactant $CaCO_3$ | 1.3 | 1.5 | 1.6 | 1.6 |
| Surfactant - $CaCO_3$ | 1.5 | 1.5 | 1.9 | 1.8 |
| Succinic Acid - Surfactant $CaCO_3$ | 1.3 | 1.2 | 1.2 | 1.2 |

[1]Salinity = 90,000 parts per million total dissolved solids.
[2]Salinity = 107,000 parts per million total dissolved solids.

EXAMPLE II

In this example, sodium potassium tartrate and sodium citrate were tested for their effectiveness as sacrificial agents. This surfactant system consisted of 0.77 percent petroleum sulfonate TRS-18 ®, 3.69 percent petroleum sulfonate TRS-40 ®, and 2.93 percent of the ethoxylated nonyl phenol solubilizer used in Example I, mixed in a synthetic field brine containing 105,000 ppm total dissolved solids. The concentration of sodium citrate and sodium potassium tartrate added to the surfactant system was varied.

All experiments were conducted with a bailed and washed oil sand. In each test, 10 grams of sand and 50 cubic cm of the surfactant-carboxylate solutions or the base-line solutions containing surfactant alone were agitated at 60° for twenty-four hours with a mechanical mixer which simulated contact of the chemicals with the rock surfaces of the reservoir. The adsorption values represent differences in the two phase titration results for solutions contacted by the sand substrate and the "reference" solutions not contacted by the sand. The results reported in Table II show that the addition of either sodium potassium tartrate or sodium citrate to the surfactant system reduces the adsorption of the surfactant by approximately one-third.

TABLE II

| SURFACTANT ADSORPTION (mg Surfactant/gm Sand) | |
| --- | --- |
| Surfactant - Sand | 12.3 |
| Sodium potassium tartrate (1.0%) - surfactant - sand | 8.6 |
| Sodium potassium tartrate (2.5%) - surfactant - sand | 8.1 |
| Sodium citrate (2.5%) - surfactant - sand | 7.8 |

We claim:

1. In a method for recovering oil from a subterranean oil reservoir penetrated by at least one injection means and at least one production means said injection and production means being in fluid communication with each other wherein an aqueous surfactant-containing fluid and an alkyl aryl alkoxylated sulfonate, is injected into the reservoir in order to mobilize and drive the oil to the production means wherefrom it is produced, the improvement which comprises:

injecting into the reservoir first alone and then in admixture with the aqueous surfactant-containing fluid a sacrificial agent selected from the group consisting of maleic acid, succinic acid, oxalic acid, malonic acid, glutaric acid, their water soluble salts and mixtures thereof wherein the sacrificial agent is present in an amount effective to reduce the extent of the adsorption of the surfactant onto the mineral grains of the reservoir rock matrices.

2. The method of claim 1 wherein the volume of the injected fluid containing the mixture of surfactant and sacrificial agent ranges from about 0.1 to about 5 pore volumes of portion of the reservoir contacted by the fluid.

3. The method of claim 1 wherein the concentration of the injected mixture of surfactant and sacrificial agent ranges from about 0.1 to about 10.0 percent by weight of the injected mixture.

4. The method of claim 1 wherein the sacrificial agent is maleic acid.

5. The method of claim 1 wherein the sacrificial agent is succinic acid.

6. The method of claim 1 wherein the sacrificial agent is oxalic acid.

7. The method of claim 1 wherein the sacrificial agent is malonic acid.

8. The method of claim 1 wherein the sacrificial agent is glutaric acid.

9. In a method for recovering oil from a subterranean oil reservoir penetrated by at least one injection means and at least one production means said injection and production means being in fluid communication with each other wherein an aqueous surfactant-containing fluid is injected into the reservoir in order to mobilize and drive the oil to the production means wherefrom it is produced, the improvement which comprises:

injecting into the reservoir in admixture with the surfactant a sacrificial agent selected from the group consisting of oxamic acid and its water soluble salts wherein the sacrificial agent is present in an amount effective to reduce the extent of adsorption of the surfactant onto the mineral grains of the reservoir rock matrices.

* * * * *

UNITED STATES PATENT AND TRADEMARK OFFICE
CERTIFICATE OF CORRECTION

PATENT NO. : 4,217,958
DATED : August 19, 1980
INVENTOR(S) : Martha S. Doster; Mohan V. Kudchadker It is certified that error appears in the above-identified patent and that said Letters Patent are hereby corrected as shown below:

Claim 1, col. 5, line 45, "fluid and an alkyl aryl alkoxylated sulfonate is injected" should read --fluid is injected--.

Signed and Sealed this

Twenty-seventh Day of January 1981

[SEAL]

Attest:

RENE D. TEGTMEYER

Attesting Officer     Acting Commissioner of Patents and Trademarks